(12) United States Patent
Laubach et al.

(10) Patent No.: US 8,607,645 B2
(45) Date of Patent: Dec. 17, 2013

(54) TIME DELAY ADJUSTMENT MECHANISM FOR SPRINKLER SYSTEM WATER FLOW DETECTOR

(75) Inventors: William F. Laubach, Elk Grove Village, IL (US); Zoltan Borbath, Lombard, IL (US); Fred M. Butalla, III, Joliet, IL (US); James M. Murphy, St. Charles, IL (US)

(73) Assignee: Honeywell International Inc., Morristown, NJ (US)

(*) Notice: Subject to any disclaimer, the term of this patent is extended or adjusted under 35 U.S.C. 154(b) by 200 days.

(21) Appl. No.: 13/310,554

(22) Filed: Dec. 2, 2011

(65) Prior Publication Data

US 2013/0139607 A1    Jun. 6, 2013

(51) Int. Cl.
*G01F 1/28* (2006.01)

(52) U.S. Cl.
USPC ........ 73/861.76; 340/606; 340/610; 137/554; 200/293

(58) Field of Classification Search
USPC ................ 73/861.76; 340/606, 610; 137/554; 200/293
See application file for complete search history.

(56) References Cited

U.S. PATENT DOCUMENTS

| 4,782,333 A | 11/1988 | Merchant |
| 6,331,820 B1 | 12/2001 | Borbath et al. |
| 7,313,973 B2 | 1/2008 | Shachar et al. |

*Primary Examiner* — Jewel V Thompson
(74) *Attorney, Agent, or Firm* — Husch Blackwell

(57) ABSTRACT

A water flow detector has a spring driven mechanical timer responsive to the movement of a lever. The lever is connected to a paddle. The paddle is responsive to the flow of water in a pipe. The detector via the spring driven timer responds to the flow of water in the pipe after a predetermined delay.

19 Claims, 5 Drawing Sheets

TIME DELAY ADJUSTMENT MECHANISM FOR SPRINKLER SYSTEM WATER FLOW DETECTOR

FIELD

The application pertains to a water flow detector which incorporates a spring driven escapement which provides a delay function. An adjustable timing gap is established between an end of a rack for the escapement and a linearly movable stop to set overall timing delay.

BACKGROUND

Water flow detectors having a timer responsive to movement of a lever connected to a paddle are known. A known water flow detector uses an air bleed timer. U.S. Pat. No. 6,331,820, entitled Explosion Proof Water Flow Detector, issued Dec. 18, 2001, discloses a paddle type flow detector which relies on an air bleed timer. U.S. Pat. No. 4,782,333, entitled Water-flow Detector With Rapid Switching, issued Nov. 1, 1988, discloses an air bleed timer. Both of these patents are assigned to the assignee hereof and incorporated herein by reference.

In general a water flow detector using an air bleed timer has a cam. The cam, when in a first position, maintains a switch assembly in a first state. The cam when in a second position enables the switch assembly to move to a second state. The lever when moved to a second position enables the cam to move from the first position to the second position.

The time it takes the cam to move depends upon the rate at which air is set to bleed out of an air chamber formed by a diaphragm. If the air is set to bleed out quickly, the cam will move quickly from the first to the second position. If the air is set to bleed out slowly, the cam will move slowly from the first to the second position and it will take longer for the switch to move from the first to the second state.

The lever is moved from the first position to the second position by the flow of water in a riser pipe of a fire sprinkler assembly. The water causes the paddle to move from a first to a second position. If the lever is not in the second position, the cam cannot move from the first to the second position. Accordingly the switch can not move from the first state to the second state. Whether the cam moves from the first to the second position depends on the rate of air bleed and the duration of suitable water flow.

If the water flow stops before the air bleed is complete, the cam will be moved back to the first position by the lever prior to the cam moving to the second position. The switch will not move to the second state. For instance, if the bleed duration is 50 seconds then the cam will move from the first to the second position in 50 seconds so long as the lever is maintained in the $2^{nd}$ position by the water flow.

If the lever is not maintained in a second position by the water flow for 50 seconds then the cam will not be able to move to the second position. The switch will not move to the second state. Accordingly the longer the bleed time, the longer the water flow most continue for the switch to move from the first to the second state. The shorter the bleed time the shorter amount of time the water flow most continue for the switch to orient from the first state to the second state.

Another embodiment is disclosed in pending U. S. application Ser. No. 12/974,637 filed Dec. 21, 2010 and entitled, Water Flow Detector. The '637 application is assigned to the assignee hereof and incorporated by reference.

While timers of the type described above have been found to be useful in providing needed delays, it would be desirable to be able to reduce their complexity and cost while still providing an adjustable time delay.

DETAILED DESCRIPTION

Figure 1:
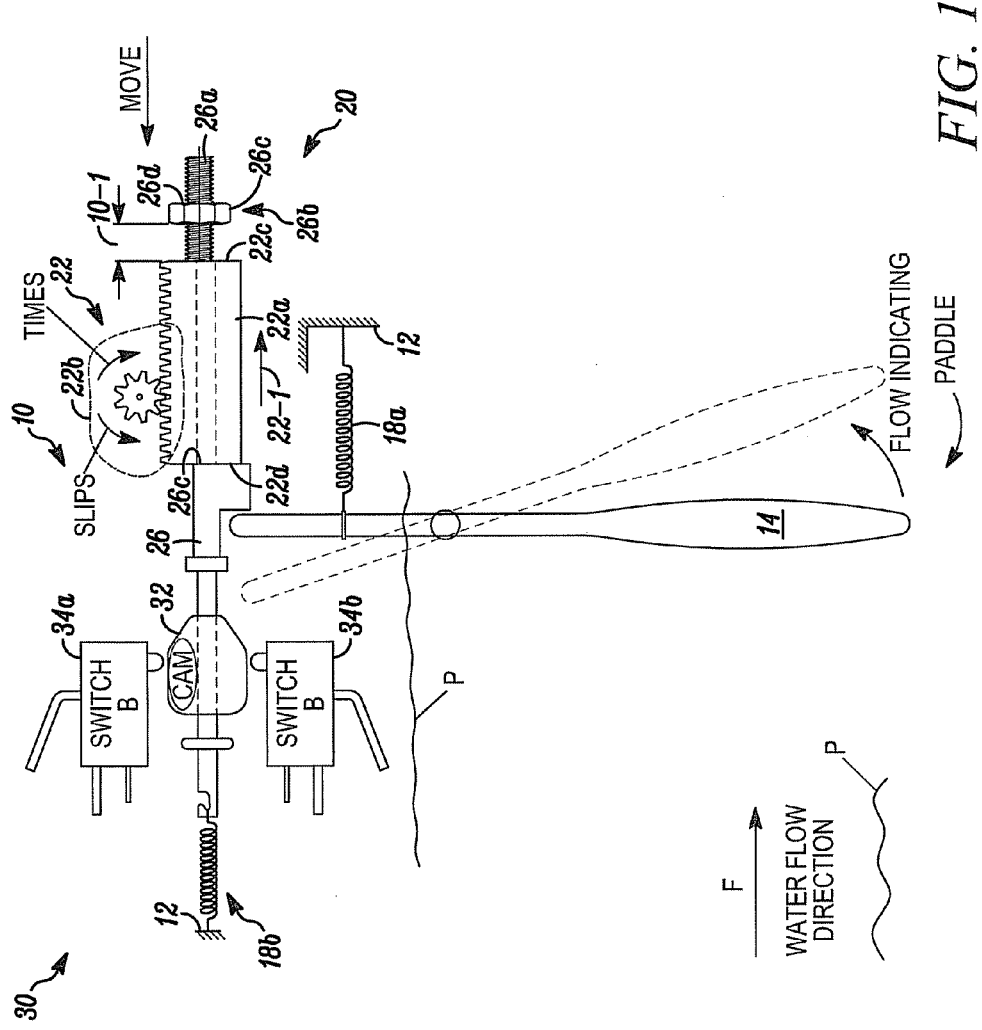
FIG. 1 is an overall diagram of an embodiment hereof.

While disclosed embodiments can take many different forms, specific embodiments thereof are shown in the drawings and will be described herein in detail with the understanding that the present disclosure is to be considered as an exemplification of the principles thereof as well as the best mode of practicing same, and is not intended to limit the application or claims to the specific embodiment illustrated.

In one aspect, a delay mechanism usable in a flow detector includes first and second mechanical elements. The first element includes an axially movable shaft which carries a switch activating cam. The initial position of the shaft is linearly adjustable to establish a free fall timing gap.

A second element comprises a spring driven escapement, a fixed timer, which limits the rate at which the shaft can move axially in response to the spring force. By adjusting the length of the free fall timing gap, the time duration that the second element operates before the cam changes position of the switch can be varied.

Embodiments hereof incorporate an adjustable nut, barrel gear and dial/knob with meshing gear teeth which can index the nut along the shaft via a thread on the shaft. The nut then forms a stop against a fixed time delay, the second element, which includes a gear rack of a verge and foliot-type escapement which provides the time delay function. Changing the length of the free fall timing gap (distance between the nut and gear rack in rest position) changes the length of time that the timer is working, prior to a switch change, and hence the time delay.

In accordance herewith, the time delay is altered by adjusting a manually rotatable dial. Rotating the dial then changes the timing gap.

Advantageously, such embodiments do not require electrical energy for the timer mechanism. All required energy is supplied by an incorporated spring.

In yet another aspect hereof, the time delay mechanism is activated by movement of a spring biased water flow sensing paddle from a no flow to a flow position. As those of skill will understand, the paddle is installed in a water supply pipe which is part of a fire suppression sprinkling system.

When the paddle moves to the flow indicating position, a second spring, part of the delay mechanism, pulls the shaft and nut, axially until the nut engages an adjacent end of the rack. This in turn causes the timer to operate for a period of time determined by the initial length of the gap, which alters the axial starting position of the rack and the delay provided thereby.

When the cam has moved a required distance, in response to the driving force of the detector's second spring, a switch closing/opening can be produced indicative of sensed flow. The resulting electrical signal can in turn be detected at a monitoring, or fire detecting station, or, system. When flow ceases, the detector can automatically reset itself.

FIG. 1 illustrates an embodiment of a water flow detector 10 in accordance herewith. The detector 10 can be carried on a mounting plate 12.

A flow indicating lever 14 can be rotatably carried by the plate 12, biased to a no-flow state by a spring 18a. Lever 14 can move from the indicated no flow position to the flow indicating position, indicted in phantom, in response to water flow F in an adjacent pipe P.

Detector 10 carries first and second mechanical structures, 20, 22 which provide a delay in responding to the movement of the lever 14. Structure 20 includes an axially movable shaft 26 with a threaded end 26a. The end 26a carries a nut 26b threaded onto the portion 26a and rotatable therealong.

The nut 26b also carries an interior set of threads 26c which can be used to rotate the nut 26b along the shaft 26a, discussed subsequently.

The second structure, a timer/brake assembly, 22 includes a rack 22a, with teeth 22a-1, and associated escapement mechanism 22b. The mechanism 22b permits the rack to move freely in a slip direction 22-1. Movement opposite the direction 22-1, a timed direction, is regulated by operation of the escapement and rack combination which implements the timer/brake 22.

Those of skill will appreciate that one implementation of the timer/brake 22 could be a verge and foliot-type escapement mechanism. Other types of mechanisms could be used, without limitation, without departing from the spirit and scope hereof.

The detector 10 also includes a switch and cam mechanism 30 which can produce a contact opening or closure in response to lever 14 moving to the flow position, and subsequent to a delay provided by the mechanism 20, 22. Cam 32 is carried on shaft 26. The switches 34a, b open or close in response to movement of cam 32.

A spring 18b which is extended when the lever 14 is biased to the no flow condition, provides a force to draw the cam 32 axially toward the switches 34a, b once the lever 14 moves into the flow indicating position. The shaft 26, also drawn by the spring 18b closes a gap 10-1 between the nut 26b and the rack 22a.

When surface 26d, see FIG. 1, of the nut 26b contacts the end surface 22c of the rack 22a, the timer mechanism 22 starts to function. This brakes motion of shaft 26 thereby delaying the time when cam 32 can trip the switches 34a, b.

Once the switches 34a, b are tripped by the cam 32, and water flow ceases, the lever 14 will return to the no flow position. In this condition surface 26e of the shaft 26 forces the rack 22a to a no flow state by moving it in the slip direction 22-1. This represents a common initial state of the apparatus prior to the lever 14 moving toward a flow indicating state.

In summary, when the gap 10-1 is increased, the timer/brake 22 is engaged later and there is less of a delay. When the gap 10-1 is decreased, the timer/brake 22 is engaged sooner and a longer delay results.

FIGS. 2-5 illustrate aspects of another embodiment hereof. Elements previously discussed have been assigned the same identification numerals and need not be discussed further.

Figure 2:
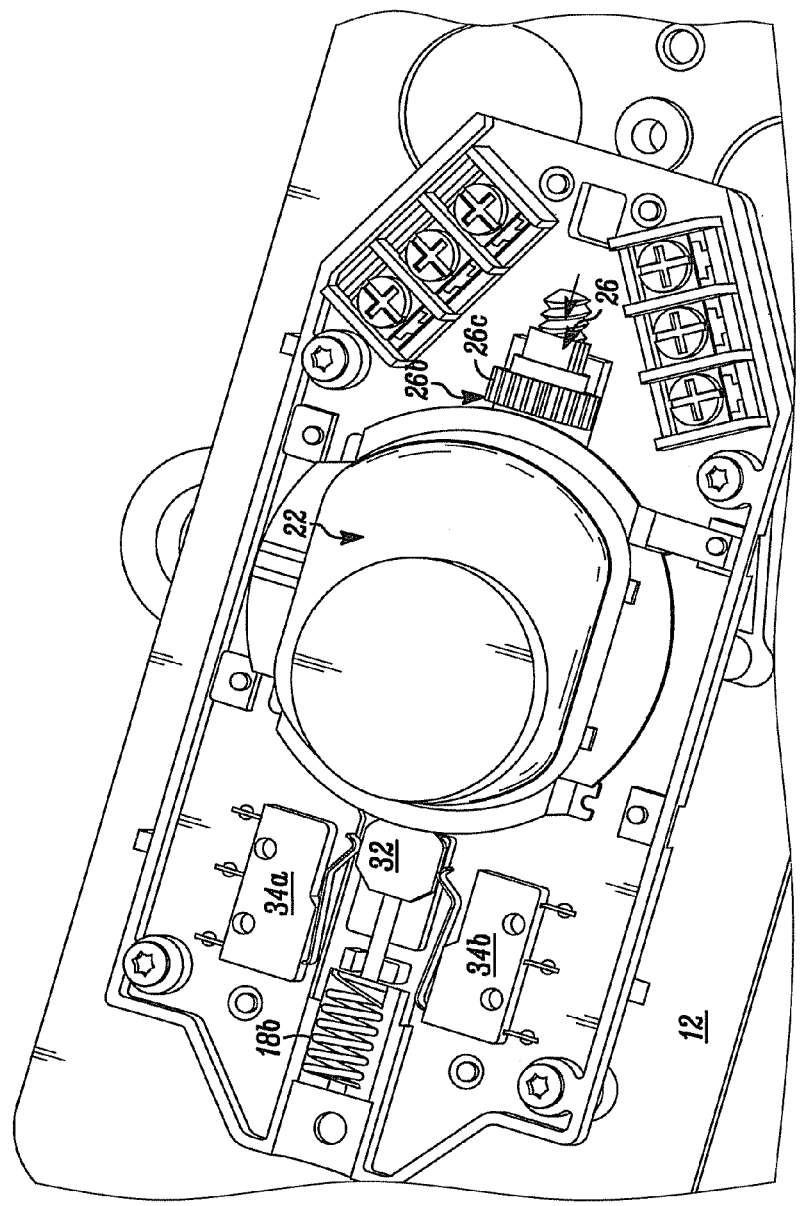
FIG. 2 illustrates a timer/brake installed on an embodiment as in FIG. 1.
Figure 3:
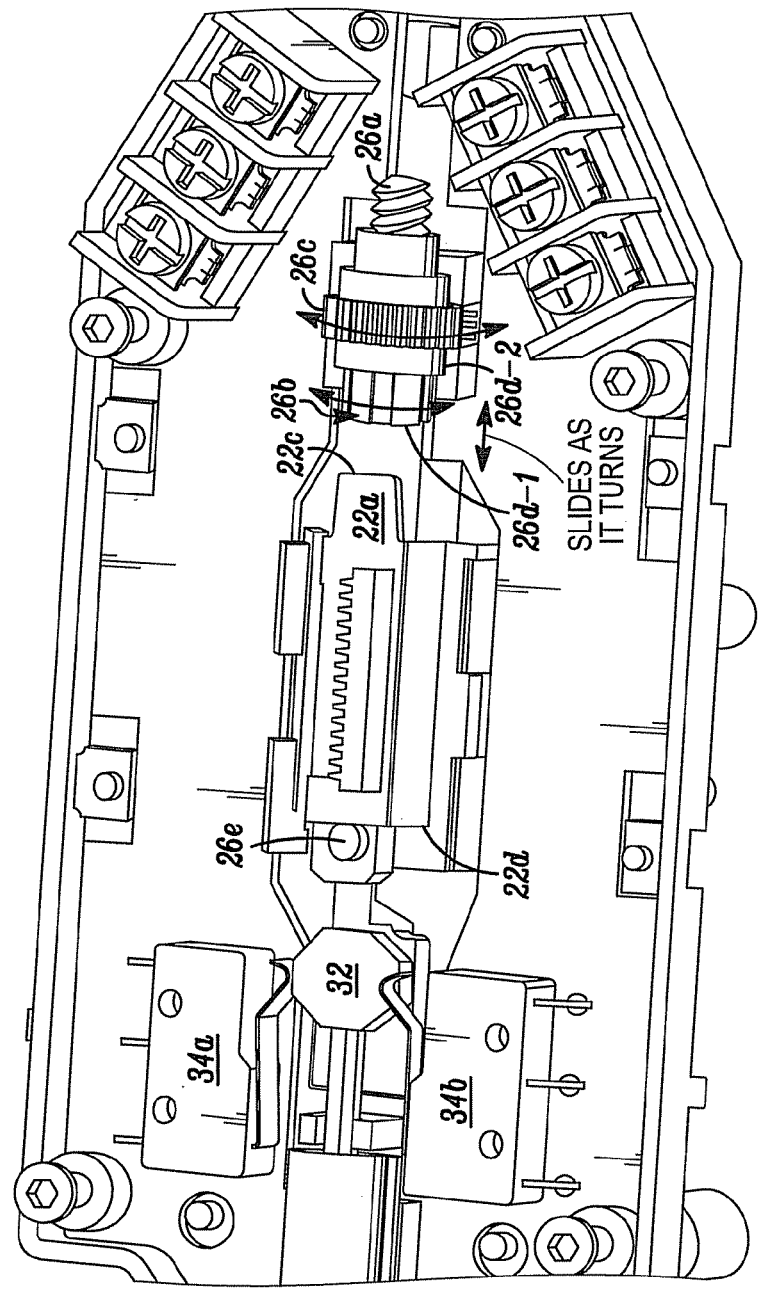
FIG. 3 illustrates the embodiment of FIG. 2 with the timer/brake removed exposing the associated rack.

FIG. 2 illustrates the timer 22 installed in place on an apparatus comparable to the apparatus 10 of FIG. 1. The timer 22 is in a fixed position on the assembly. FIG. 2 illustrates the location of the spring 18b and the direction that the spring 18b pulls on the main shaft 26 and cam assembly 32.

The switches 34a, b are illustrated in a standby position. The main flow sensing pivot shaft 14 is in a no flow state, holding the shaft/cam assembly 26/32 to the right In FIG. 3, timer 22 has been removed to expose rack 22a and related components in an initial no flow state. The gap 10-1 has been reduced substantially to zero in FIG. 3. In this configuration, the timer/brake 22 will produce a maximum delay.

Figure 4:
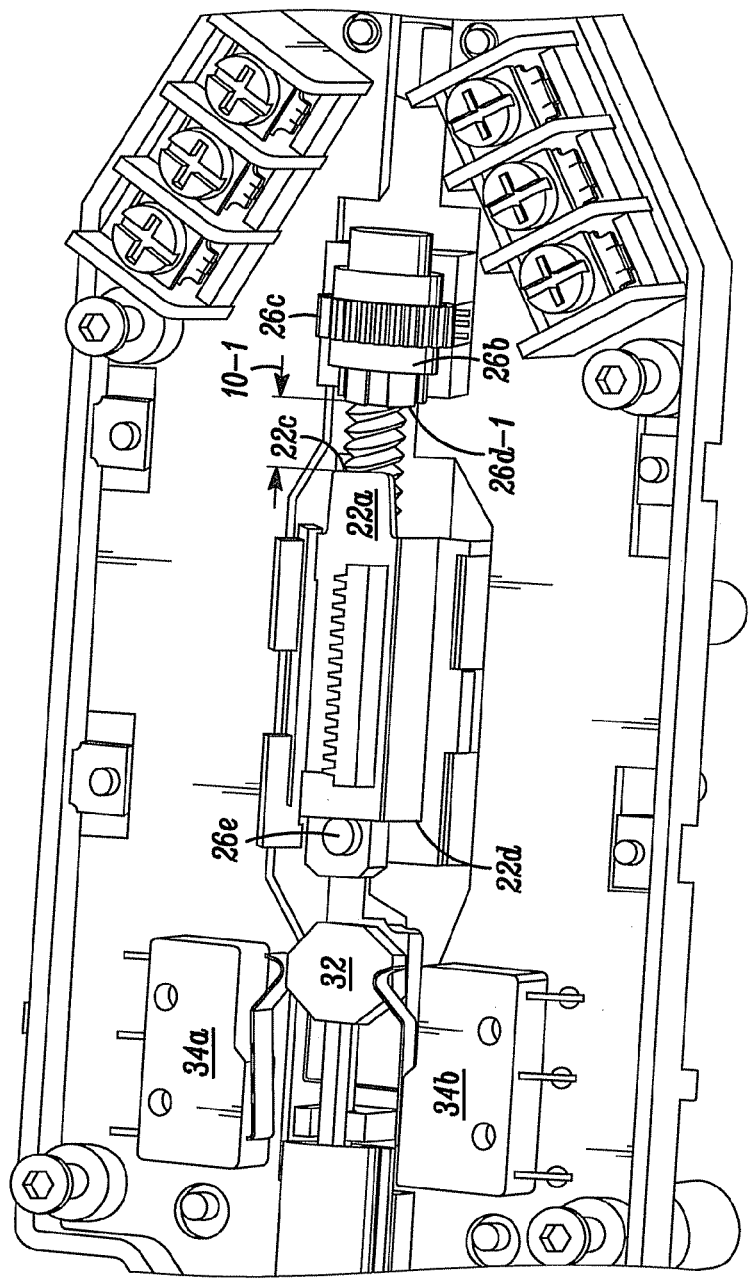
FIG. 4 illustrates the embodiment of FIG. 3 with a gap between the rack and the slide nut.

FIG. 4 illustrates the gap 10-1 produced by rotating the gear 26c to move the nut 26b away from the rack 22. To produce a reduced delay. Once the surface 26d-1 contacts end 22c of the rack 22, the timer/brake 22 will start to function to provide a delay.

Figure 5:
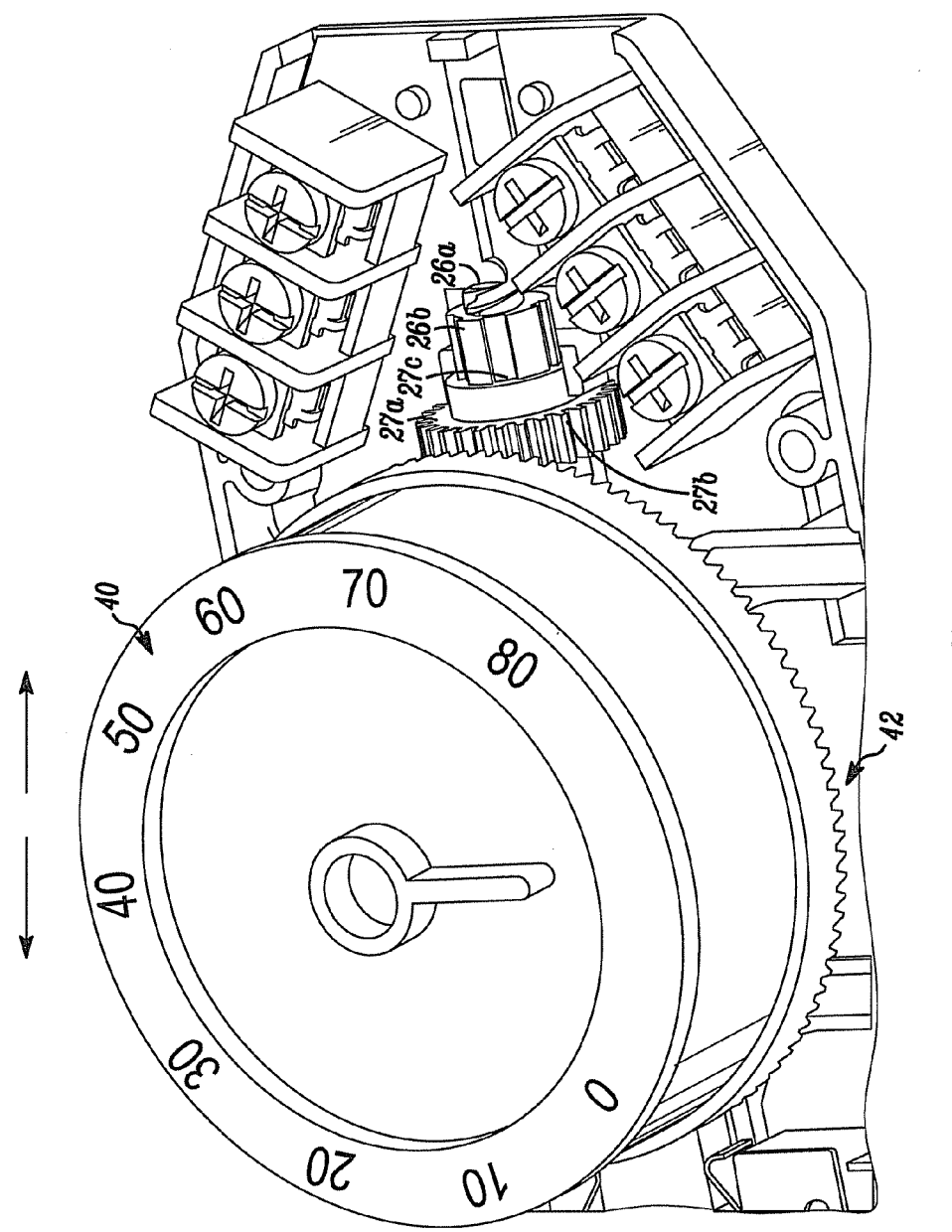
FIG. 5 illustrates the embodiment of FIG. 3 with a delay adjusting knob installed.

FIG. 5 illustrates a knob or dial 40 with teeth 42 that mesh with the teeth 27b of pinion gear 27a. Pinion 27a is slidably locked to the nut 26b by grooves 26b-1 in nut 26b. The grooves 26b-1 slidably engage radial members 27c of the pinion 27a. Turning the dial 40 rotates the nut 26b thereby sliding it along the threaded portion 26a of timer shaft 26. As a result the delay can be increased or decreased. In accordance with the above, the pinion gear 27a rotates in response to movement of the knob 40 which in turn causes the nut 26b to both rotate (due to the grooves 26b-1 and extending radial members 27c) and move axially relative to the shaft 25 as it rotates on threads 26a.

With respect to FIG. 5, in summary, the pinion gear 27a rotates the nut 26b as the knob 40 is being turned. Gear 27a has teeth 27b that interface with the teeth 42 on the knob 40 and also has interlock groves 27c along which the nut 26b slides. The pinion 27a is stationary except for rotation when the knob 40 spins it.

In response to rotating the knob 40, the threaded nut 26b slides on the shaft 26a as shown. This sliding in turn adjusts the length of the gap 10-1 as described above. The timer shaft 26a, during timing stroke, is locked to the nut 26b and pulls the nut 26b along. As a result, nut 26b glides axially through the pinion gear 27a.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown, or sequential order, to achieve desirable results. Other steps may be provided, or steps may be eliminated, from the described flows, and other components may be add to, or removed from the described embodiments.

The invention claimed is:

1. An assembly forming part of a water flow detector, the assembly comprising:
    a mounting plate;
    a switch assembly carried by the mounting plate;
    a lever rotatably coupled to said mounting plate,
    a gear assembly, the gear assembly includes an axially movable shaft with a starting position and a spring activated timer, the shaft is released from the starting position by movement of the lever and arrives at a switch activating position in response to action of the timer; and
    wherein the switch assembly changes state, at least in part, in response to movement of the shaft to the switch activating position.

2. The assembly of claim 1 wherein the spring activated timer comprises a rack.

3. The assembly of claim 2 wherein when the lever is in a first position, the rack is in an unengaged position and wherein when the lever is in a second position the rack is engaged for movement to a final position; and wherein when the rack has moved to a selected position the switch assembly changes state.

4. The assembly of claim 3 further comprising an activating spring.

5. The assembly of claim 4 wherein the shaft is freely movable by the spring, relative to the rack, a predetermined distance.

6. The assembly of claim 5 where the shaft carries a rack engaging surface.

7. The assembly of claim 6 where the rack engaging surface is carried on an adjustable member which establishes the predetermined distance.

8. The assembly of claim 7 where the predetermined distance substantially establishes a delay between when the lever moves from the first position and when the switch assembly changes state.

9. The assembly of claim 8 where the adjustable member includes a nut, with delay setting threads, axially movable on the shaft.

10. The assembly of claim 9 where the nut carries the delay setting threads internally oriented generally along the shaft, and external nut rotating threads, oriented circumferentially around the nut.

11. The assembly of claim 10 which includes a manually movable member having a circular set of gear teeth.

12. The assembly of claim 11 wherein when the manually movable member is rotated, the circular teeth engage the external nut rotating threads to move the nut axially.

13. The assembly of claim 12 wherein rotating the nut axially changes the predetermined distance.

14. The assembly of claim 12 where when the lever is in the first position the rack and the shaft exhibit a predetermined initial relationship relative to one another.

15. The assembly of claim 14 where adjusting the gap does not alter the predetermined initial relationship between the rack and the shaft.

16. A flow detector comprising:
a housing;
a flow indicating lever rotatably carried by the housing, biased to a no flow position;
an axially movable shaft, in part threaded, the shaft is slidably carried by the housing;
a nut threadably carried on the shaft;
a mechanical timer which interacts with at least a portion of the nut;
a switch assembly slidably activated by movement of the shaft; and
a spring coupled to the shaft to axially move the shaft from a no flow position, in response to the lever rotating from a no flow position to a flow position, and where the nut activates the timer, in response to the movement of the shaft, wherein the timer inhibits movement of the shaft for a delay interval, and subsequent thereto the switch assembly changes state.

17. A flow detector as in claim 16 wherein the timer incorporates a mechanical escapement which permits axial movement of the shaft in one direction and timed axial motion of the shaft in an opposite direction.

18. A flow detector as in claim 16 wherein an overall delay value can be adjusted by rotating the nut to provide a gap between the timer and the nut.

19. A flow detector as in claim 16 wherein the shaft and a portion of the timer have a repeating initial position, relative to one another, when the lever returns to the no flow indicating position.

* * * * *